United States Patent
Peters et al.

(10) Patent No.: US 12,361,500 B2
(45) Date of Patent: Jul. 15, 2025

(54) AGRICULTURAL PLANTING MACHINE WITH FIELD CONTOUR SENSORS

(71) Applicant: Deere & Company, Moline, IL (US)

(72) Inventors: John L. Peters, Geneseo, IL (US); Thomas G. Bartlett, Ankeny, IA (US); Lee A. Johnson, Polk City, IA (US); Kevin P. Cowles, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 697 days.

(21) Appl. No.: 17/667,075

(22) Filed: Feb. 8, 2022

(65) Prior Publication Data

US 2023/0252587 A1    Aug. 10, 2023

(51) Int. Cl.
*G06Q 50/02* (2024.01)
*A01C 7/08* (2006.01)

(52) U.S. Cl.
CPC ............ *G06Q 50/02* (2013.01); *A01C 7/08* (2013.01)

(58) Field of Classification Search
CPC .......... G06Q 50/02; G06Q 50/00; A01C 7/08; A01C 7/00
See application file for complete search history.

(56) References Cited

U.S. PATENT DOCUMENTS

| 6,199,000 B1 | 3/2001 | Keller et al. |
| 2019/0254223 A1 | 8/2019 | Eichhorn et al. |
| 2021/0084805 A1 | 3/2021 | Cozza et al. |
| 2021/0315148 A1 | 10/2021 | Fanshier et al. |

FOREIGN PATENT DOCUMENTS

EP    3300568 A1    4/2018

OTHER PUBLICATIONS

Extended European Search Report and Written Opinion issued in European Patent Application No. 23155331.4, dated Jul. 10, 2023, in 8 pages.

*Primary Examiner* — Christopher J. Novosad
(74) *Attorney, Agent, or Firm* — Christopher J. Volkmann; Kelly, Holt & Christenson, P.L.L.C.

(57) ABSTRACT

An agricultural planting machine includes a frame and a planting system supported on the frame and configured to plant seeds in a row. The planting system includes a ground-engaging element movable relative to the frame and configured to engage a ground surface of a field. A field contour detection system is configured to receive in-situ sensor data representing a location of the ground-engaging element, generate field contour data representing a contour of the ground surface based on the in-situ sensor data, and generate a control signal based on the field contour data.

21 Claims, 16 Drawing Sheets

AGRICULTURAL PLANTING MACHINE WITH FIELD CONTOUR SENSORS

FIELD OF THE DESCRIPTION

The present description generally relates to agricultural equipment. More specifically, but not by limitation, the present description relates to an agricultural planting machine having field contour sensors configured to generate and use field contour data for agricultural operations.

BACKGROUND

There are a wide variety of different types of agricultural machines. Such agricultural machines can include different types of planting machines, such as row planters, air seeders, seed drills, and the like. Further, agricultural machines can also include tillers, sprayers, harvesters, and other equipment.

These types of equipment often have many different mechanisms that can be controlled, either by an operator or automated control systems, or combinations of automation and manual input. One aspect that can be controlled, depending on the agricultural operation, is height relative to the field surface. For example, some agricultural machines have implements that include tools that engage the soil, e.g., tillers, planters, etc. have ground-engaging tools and are controlled to an operating depth. It Is often desirable to maintain the operating depth consistently while the machine travels across the field, and if the operating depth is to be modified, it can also be important to ensure the depth is modified accurately and efficiently. Other types of agricultural machines, such as harvesters and sprayers, have tools that operate at a desired operational height above the field surface. For example, in the case of a sugarcane harvester, it is often desired to cut the sugarcane crop close to the ground due to high sugar content in the lower section of the stalk. In the case of an agricultural sprayer, boom height is controlled to spray at a desired height to achieve proper coverage and mitigate drift caused by wind.

The discussion above is merely provided for general background information and is not intended to be used as an aid in determining the scope of the claimed subject matter.
SUMMARY An agricultural planting machine includes a frame and a planting system supported on the frame and configured to plant seeds in a row. The planting system includes a ground-engaging element movable relative to the frame and configured to engage a ground surface of a field. A field contour detection system is configured to receive in-situ sensor data representing a location of the ground-engaging element, generate field contour data representing a contour of the ground surface based on the in-situ sensor data, and generate a control signal based on the field contour data.

Example 1 is an agricultural planting machine comprising:
 a frame;
 a planting system supported on the frame and configured to plant seeds in a row, the planting system comprising
  a ground-engaging element movable relative to the frame and configured to engage a ground surface of a field; and
 a field contour detection system configured to:
  receive in-situ sensor data representing a location of the ground-engaging element;
  generate field contour data representing a contour of the ground surface based on the in-situ sensor data; and
  generate a control signal based on the field contour data.

Example 2 is the agricultural planting machine of any or all previous examples, wherein the planting system comprises a row unit, and the ground-engaging element comprises a rotatable element on the row unit.

Example 3 is the agricultural planting machine of any or all previous examples, wherein the rotatable element comprises a gauge wheel of the row unit.

Example 4 is the agricultural planting machine of any or all previous examples, wherein
 the gauge wheel includes a linkage having an angle, relative to the frame, that varies with positional changes of the gauge wheel, and
 the in-situ sensor data is received from a sensor coupled to the linkage and represents the angle.

Example 5 is the agricultural planting machine of any or all previous examples, wherein the sensor comprises an encoder.

Example 6 is the agricultural planting machine of any or all previous examples, wherein the linkage comprises a rockshaft pivotally coupled to the frame.

Example 7 is the agricultural planting machine of any or all previous examples, wherein the in-situ sensor data comprises:
 first data representing a first position of the frame; and
 second data representing a second position of the ground-engaging element relative to the frame.

Example 8 is the agricultural planting machine of any or all previous examples, wherein field contour data comprises a three-dimensional point cloud.

Example 9 is the agricultural planting machine of any or all previous examples, wherein the control signal is configured to control the agricultural planting machine to at least one of:
 store the field contour map in a data store; or
 output the field contour map.

Example 10 is the agricultural planting machine of any or all previous examples, and further comprising:
 a position sensor mounted to the ground-engaging element and configured to generate the in-situ sensor data.

Example 11 is a computer-implemented method comprising:
 receiving in-situ sensor data representing a location of a ground-engaging element movably mounted relative to a frame of an agricultural planting machine;
 generating field contour data representing a contour of a ground surface of a field based on the in-situ sensor data; and
 generating a control signal based on the field contour data.

Example 12 is the computer-implemented method of any or all previous examples, wherein the agricultural planting machine includes a row unit, and the ground-engaging element comprises a rotatable element on the row unit.

Example 13 is the computer-implemented method of any or all previous examples, wherein the rotatable element includes a linkage having an angle, relative to the frame, that varies with positional changes of the rotatable element, and the in-situ sensor data is received from a sensor coupled to the linkage and represents the angle.

Example 14 is the computer-implemented method of any or all previous examples, wherein the in-situ sensor data comprises first data representing a first position of the frame, and second data representing a second position of the ground-engaging element relative to the frame.

Example 15 is the computer-implemented method of any or all previous examples, wherein the field contour data comprises a three-dimensional point cloud.

Example 16 is the computer-implemented method of any or all previous examples, wherein generating a control signal comprises at least one of:
  storing the field contour map in a data store; or
  outputting the field contour map.

Example 17 is a control system for an agricultural planting machine, the control system comprising:
  at least one processor; and
  memory storing instructions executable by the at least one processor, wherein the instruction, when executed, cause the control system to:
    receive first sensor data representing a location of a frame of the agricultural planting machine, the agricultural planting machine including a row unit movably mounted relative to the frame, and the row unit having a ground-engaging element configured to engage a ground surface of a field;
    receive second sensor data representing a location of the ground-engaging relative to the frame;
    generate field contour data representing a contour of the ground surface of the field based on the first sensor data and the second sensor data; and
    generate a control signal based on the field contour data.

Example 18 is the control system of any or all previous examples, wherein the second sensor data indicates an angle of a linkage between the ground-engaging element and the frame, wherein the angle varies with positional changes of the rotatable element.

Example 19 is the control system of any or all previous examples, wherein the field contour data comprises a three-dimensional point cloud.

Example 20 is the control system of any or all previous examples, wherein the control signal is configured to at least one of:
  store the field contour map in a data store; or
  output the field contour map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As noted above, many different types of agricultural machines have tools that are controlled to a desired operating position, whether to engage the ground at a desired depth or to operate at a desired height above the ground surface of a field. One example ground surface detection approach utilizes aerial or other remote imagery that acquires images of the field. However, the image data is not well-defined relative to the actual crop planting locations. Further, characteristics of the field, such as the presence of clods, create noise which causes difficulty in obtaining an accurate field contour map and/or identifying the field contour relative to the crop row planting locations. Further, some detection approaches are reactive, in that the field contour is sensed in areas already operated on by the machine. For example, a harvester can be configured to sense ground height behind the cutter bar as the harvester is passing over the field. Such approaches can result in inaccurate control due to the reactive nature of post-operation sensing.

The present disclosure proceeds with respect to an agricultural planting machine having a field contour detection system configured to obtain data points representing field contour. In described examples, the data points are generated based on in-situ sensor data representing locations of ground engaging elements (e.g., gauge wheels, etc.) on row units of the planting machine. A three-dimensional (3D) point cloud, or other field contour map structure, is generated based on the sensor data.

Figure 1:
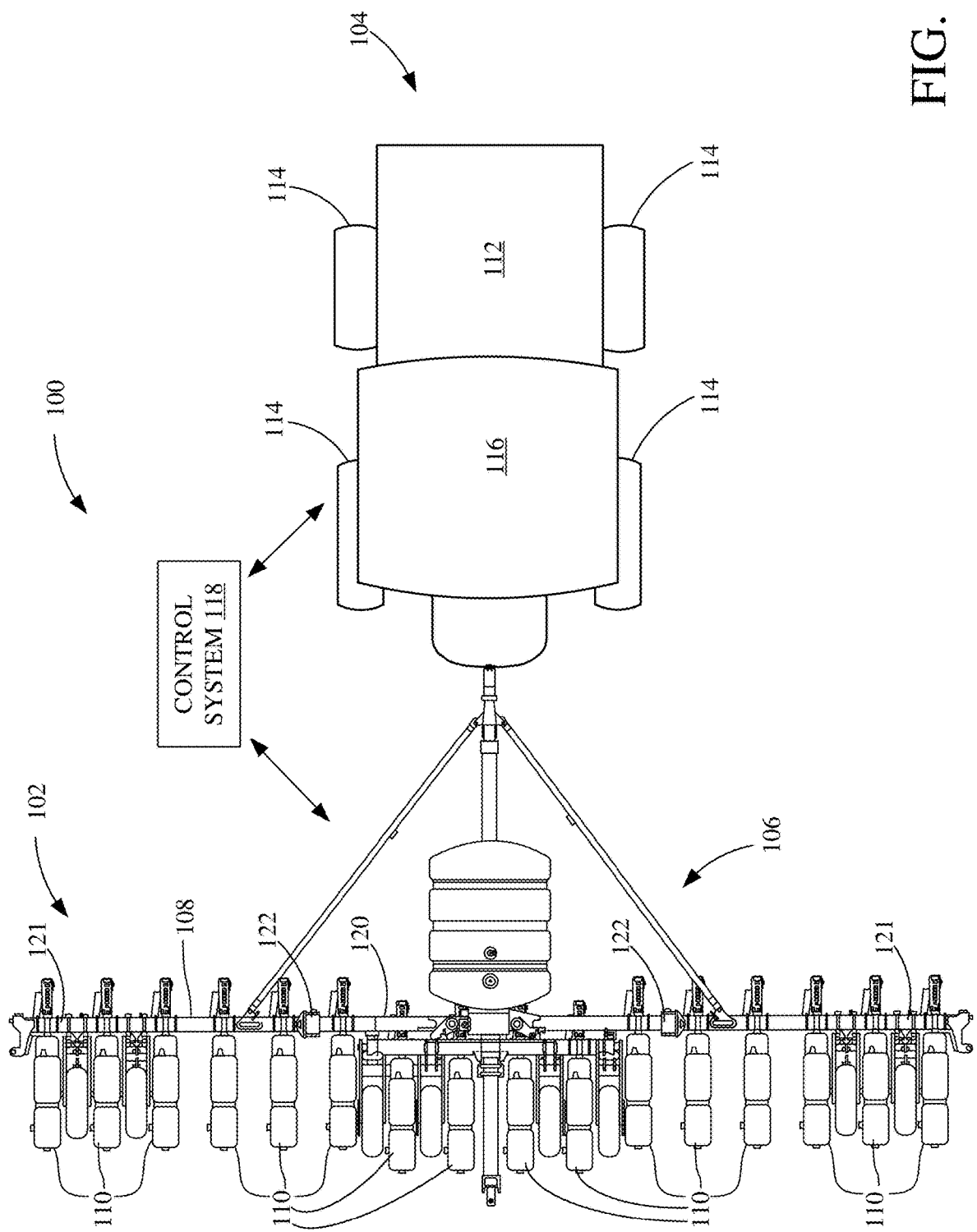
FIG. 1 is a top view of one example of an agricultural planting machine.

FIG. 1 is a top view of one example of an agricultural machine 100 including a row crop planter 102 (also referred to as planting machine 102) and a towing machine 104 (e.g., a tractor or other towing vehicle). Planting machine 102 includes a frame 106 configured to support planting machine 102 relative to towing machine 104. Frame 106 includes a toolbar 108 that supports a plurality of row units 110 mounted to toolbar 108.

Towing machine 104 can include a propulsion system, such as an engine housed in engine compartment 112, and ground-engaging elements 114, such as wheels or tracks. Towing machine 104 includes an operator compartment 116, such as a cab, which can include a number of machine controls, user input mechanisms as well as displays and other user interfaces. Towing machine 104 can be linked to planting machine 102 in a variety of ways, including, but not limited to, mechanically, electrically, hydraulically, pneumatically, etc. Through the linkage, an operator can control machine 104 to provide power to planting machine 102 and/or control the operation of planting machine 102, from the operator compartment 116 for example.

Agricultural machine 100 includes a control system 118, examples of which are described in greater detail below. Control system 118 can be on planting machine 102 or towing machine 104, or elsewhere, and control system 118 can be distributed across various locations.

Toolbar 108 of frame 106 includes a center section 120 and wing sections 121 pivotably coupled to ends of center section 120 by corresponding joint or pivot assemblies 122. Wing sections 121 are configured to pivot about pivot assemblies 122 as planting machine 102 traverses the field, which allows the row units 110 on wing sections 121 follow the contour of the field. Also, wing sections 121 can be pivoted upwardly to a stowed position for transport.

Figure 2:
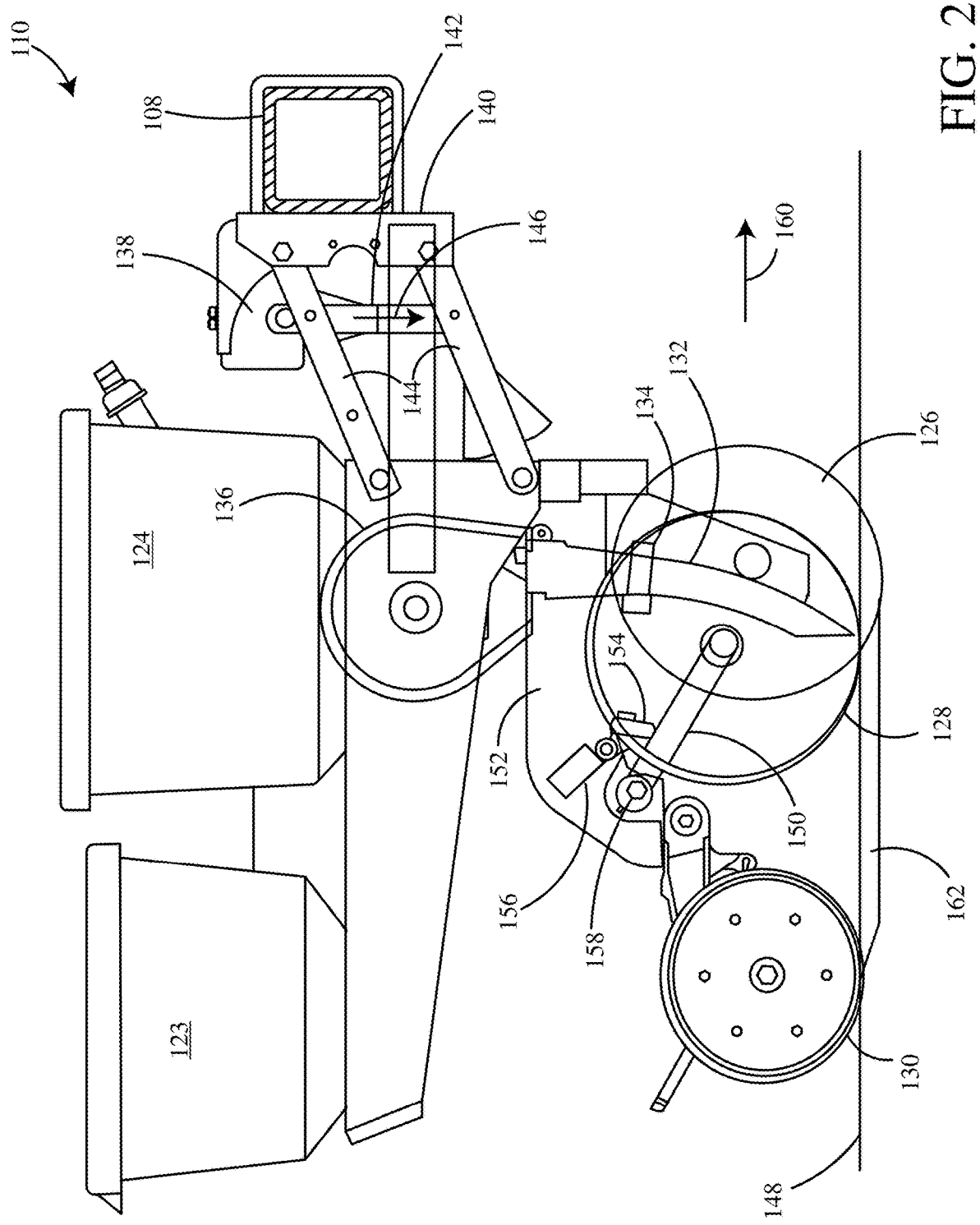
FIG. 2 is a side view showing one example of a row unit.

FIG. 2 is a side view showing one example of a row unit 110. Row unit 110 includes a chemical tank 123 and a seed storage tank 124. Row unit 110 also includes a number of ground-engaging elements, including a furrow opener 126 (such as a double disc opener or other type opener), one or more gauge wheels 128, and one or more row closers 130 (illustratively closing wheels). Seeds from seed storage tank 124 are fed by gravity into a seed meter 136. Seed meter 136 controls the rate at which seeds are dropped into a seed tube 132 or other seed delivery system, such as a brush belt, from seed storage tank 124. The seeds can be sensed by a seed sensor 134.

A downforce actuator 138 is mounted on a coupling assembly 140 that couples row unit 110 to toolbar 108. Actuator 138 can be a hydraulic actuator, a pneumatic actuator, a spring-based mechanical actuator or a wide variety of other actuators. In the example shown in FIG. 2, a rod 142 is coupled to a parallel linkage 144 and is used to exert an additional downforce (in the direction indicated by arrow 146) on row unit 110 toward the ground 148.

A set of gauge wheel control arms (or gauge wheel arms) 150 movably mount gauge wheels 128 to a shank 152 and control an offset between gauge wheels 128 and the discs in furrow opener 126, to control planting depth. Control arms 150 abut against a mechanical stop (or arm contact member- or wedge) 154. The position of mechanical stop 154 relative to shank 152 can be set by a planting depth actuator assembly 156. Control arms 150 illustratively pivot around pivot point 158 so that, as planting depth actuator assembly 156 actuates to change the position of mechanical stop 154, the relative position of gauge wheels 128, relative to furrow opener 126, changes to change the depth at which seeds are planted.

In operation, row unit 110 travels generally in the direction indicated by arrow 160. Furrow opener 126 opens a furrow 162 in the ground 148, and the depth of the furrow 162 is set by planting depth actuator assembly 156, which, itself, controls the offset between the lowest parts of gauge wheels 128 and furrow opener 126. Seeds are dropped through seed tube 132, into the furrow 162 and row closer 130 closes the soil.

In accordance with one example, actuator assembly 156 can be automatically actuated by control system 118, from the operator compartment of the towing vehicle. Actuator assembly 156 can also be actuated based on an operator input detected through control system 118, and/or automatically actuated to automatically change the planting depth as row unit 110 is towed across the field.

Figure 3:
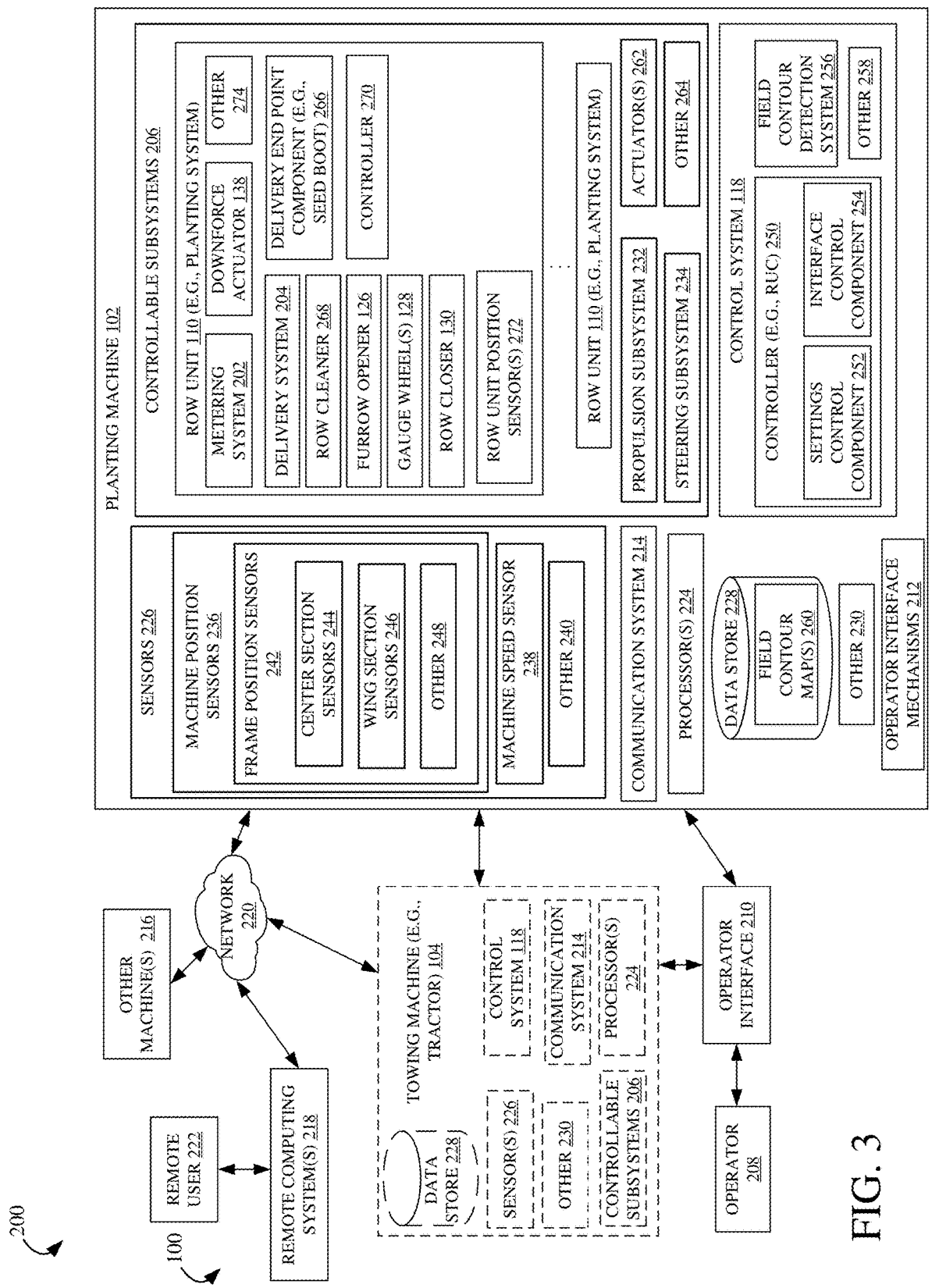
FIG. 3 is a block diagram of one example of an agricultural machine architecture.

FIG. 3 is a block diagram of one example of an agricultural machine architecture 200. For sake of illustration, but not by limitation, architecture 200 will be described in the context of agricultural machine 100 including planting machine 102 shown in FIG. 1. Each row unit 110 includes a planting system having a metering system 202 (e.g., seed sensor 134, seed meter 136, etc.) and a delivery system 204 (e.g., seed tube 132) disposed thereon or otherwise associated with the row unit 110. While details of a single row unit 110 are illustrated in FIG. 3 and discussed in further detail below, it is noted that other row units 110 can include similar components.

As shown, planting machine 102 includes control system 118 configured to control controllable subsystems 206 that perform operations on a field or other worksite. For instance, an operator 208 can interact with and control planting machine 102 through an operator interface 210 provided by operator interface mechanisms 212. Operator 208 can also interact with and control towing machine 104 through operator interface mechanisms corresponding to machine 104. Operator interface mechanisms can include such things as a steering wheel, pedals, levers, joysticks, buttons, dials, linkages, etc. In addition, operator interface mechanisms can include a display device that displays user actuatable elements, such as icons, links, buttons, etc. Where the device is a touch sensitive display, those user actuatable items can be actuated by touch gestures. Similarly, where operator interface mechanisms include speech processing mechanisms, then operator 208 can provide inputs and receive outputs through a microphone and speaker, respectively. Operator interface mechanisms 212 can include any of a wide variety of other audio, visual or haptic mechanisms.

Planting machine 102 includes a communication system 214 configured to communicate with other systems or machines in architecture 200. For example, communication system 214 can communicate with other machines, such as towing machine 104 and/or other machines 216 operating with respect to the field. For example, machines 216 can include unmanned aerial vehicles (UAVs) or drones configured to obtain field contour data. Examples are discussed in further detail below.

Communication system 214 is configured to communicate with one or more remote computing systems 218 over a network 220. Network 220 can be any of a wide variety of different types of networks. For instance, network 220 can be a wide area network, a local area network, a near field communication network, a cellular communication network, or any of a wide variety of other networks, or combinations of networks.

Communication system 214 can include wireless communication logic, which can be substantially any wireless communication system that can be used by the systems and components of planting machine 102 to communicate information. In one example, communication system 214 communicates over a CAN bus (or another network, such as an Ethernet network, etc.) to communicate information. This information can include the various sensor signals and output signals generated based on the sensor variables and/or sensed variables.

A remote user 222 is illustrated as interacting with remote computing system 218, which can be a wide variety of different types of systems. For example, remote computing system 218 can be a remote server environment used by remote user 222, such as to receive communications from or send communications to planting machine 102 through communication system 214. Further, remote computing system 218 can include a mobile device, a remote network, or a wide variety of other remote systems. Remote user 222 can receive communications, such as notifications, requests for assistance, etc., from planting machine 102 on a mobile device. Remote computing system 218 can include one or more processors or servers, a data store, and other items as well.

Planting machine 102 includes one or more processors 224, sensors 226, a data store 228, and can include other items 230 as well. It is noted that while planting machine 102 is illustrated in FIG. 3 as a towed implement, that is towed by towing machine 104, in one example planting machine 102 can be self-propelled. For instance, controllable subsystems 206 can include a propulsion subsystem 232 and a steering subsystem 234. Also, it is noted that elements of planting machine 102 can be provided on, or distributed across, towing machine 104, which is represented by the dashed blocks in FIG. 3.

Sensors 226 can include any of a wide variety of sensors. For instance, sensors 226 can include machine position sensors 236, machine speed sensors 238, and can include other sensors 240 as well.

Machine position sensors 236 are configured to identify a position of planting machine 102 and/or a corresponding route (e.g., heading) of planting machine 102 as planting machine 102 traverses the worksite (e.g., a target field to be planted). Machine position sensors 236 can include, but are not limited to, a Global Navigation Satellite System (GNSS) receiver that receives signals from a GNSS satellite transmitter. One example includes a Global Positioning System (GPS). Position sensor 236 can also include a Real-Time Kinematic (RTK) component that is configured to enhance the precision of position data derived from the GNSS signal from a receiver. Illustratively, an RTK component uses measurements of the phase of the signal's carrier wave in addition to the information content of the signal to provide real-time corrections, which can provide up to centimeter-level accuracy of the position determination.

Further, machine position sensors 236 can detect the relative positions of portions of planting machine 102. For example, machine position sensors 236 can include frame position sensors 242 configured to detect a position of frame 106, such as the orientation (e.g., pitch, etc.) of frame 106 relative to a horizontal plane, and/or geographical coordinates (e.g., the latitude, longitude, and altitude) of the frame. Illustratively, frame position sensors 242 include center section sensors 244, wing section sensors 246, and can include other sensors 248.

Center section sensors 244 are configured to detect a position of center section 120 of toolbar 108 in a three-dimensional coordinate system. Examples are discussed in further detail below. Briefly, however, center section sensors 244 can include position detectors (such as an GPS-RTK sensors) located on opposite ends of center section 120, such as near pivot assemblies 122. Signals from the center section sensors 244 are utilized to identify, with a relatively high degree of accuracy (e.g., centimeter-level accuracy), the position of each end of center section 120. This position information can include the latitude, longitude, and altitude or elevation. Based on a first position of a first end of center section 120 and a second position of the second end of center section 120, control system 118 can determine the orientation of center section 120. Further, the latitude, longitude, and altitude of the mounting locations of each row unit 110 along center section 120 can be determined based on this data.

Wing section sensors 246 are configured to detect a position of wing sections 121. Examples are discussed in further detail below. Briefly, however, wing section sensors 246 can be similar to sensors 244 and positioned at outer ends (relative to the middle of toolbar 108) of each wing section 121. Thus, wing section sensors 246 are configured to output position data (e.g., latitude, longitude, and altitude) indicating the position (e.g., latitude, longitude, elevation) of the ends of wing section 121. Control system 118 is configured to determine the orientation of wing sections 121 in a three-dimensional coordinate system based on the position data indicating the ends of wing sections 121, and position data indicating the position of center section 120 proximate pivot assemblies 122. Accordingly, the latitude, longitude, and altitude of the mounting locations of each row unit 110 along wing sections 121 can also be determined.

Machine speed sensor 238 is configured to output a signal indicative of a speed of planting machine 102. Sensor 238 can sense the movement of one or more ground-engaging elements (e.g., wheels or tracks) and/or can utilize signals received from other sources, such as position sensor 236.

Control system 118 includes a controller 250, which can include settings control component 252, and interface control component 254. Control system 118 also includes a field contour detection system 256, and can include other items 258 as well. It is noted that while field contour detection system 256 is illustrated on planting machine 102, some or all components of system 256 can be located on other items in architecture 200, and can be distributed across multiple different machines or systems. For example, some or all of field contour detection system 256 can be located on remote computing system 218 and/or machine 216.

Field contour detection system 256 is configured to receive in-situ sensor data detected from the field and generate field contour data. The field contour data can be utilized to generate a three-dimensional point cloud or other field contour map. In one example, field contour detection system 256 receives inputs from machine position sensors 236 as planting machine 102 operates on the field. Field contour maps generated by field contour detection system 256 can be stored in data store 228, as represented at block 260. Alternatively, or in addition, the field contour maps can be output to remote computing system 218, or other systems or machines.

Settings control logic 252 is configured to generate settings that are applied to, or otherwise control, controllable subsystems 206. For example, row units 110 can be controlled to selectively plant the field as planting machine 102 traverses the field. Each row unit 110 can be controlled by, for example, turning a seed meter on or off, raising and lowering the row unit 110, rotatably driving ground-engaging elements, changing the downforce applied by downforce actuator 138, etc.

Interface control logic 254 is configured to generate control signals to control operator interface mechanisms 212, such as a display device, to provide, and detect operator interaction with, operator interface 210.

Controllable subsystems 206 can also include one or more different actuators 262, and can include other items 264 as well. Actuators 262 are configured to change machine settings, machine configuration, etc.

As illustrated in FIG. 3, row unit 110 includes a delivery endpoint component 266, such as a seed boot, coupled to delivery system 204. Component 266 is configured to place seeds, metered by metering system 202, into the furrow created by furrow opener 126. FIG. 3 also illustrates that row unit 110 includes a gauge wheel(s) 128 and row closer 130. Row unit 110 can also include a row cleaner 268 that operates in front of furrow opener 126 to clean the area of the row of debris prior to the furrow being opened. Row unit 110 also includes a controller 270, one or more row unit position sensors 272, and can include other items 274 as well.

Controller 270 is configured to control row unit 110, for example based on signals from controller 250. Row unit position sensors 272 is configured to output a signal indicative of a position of a ground-engaging element of row unit 110, such as row cleaner 268, furrow opener 226, gauge wheel 128, row closer 130, etc. As discussed in further detail below, row unit position sensor 272 can detect the position of the ground-engaging element directly. For example, row unit position sensor 272 can include a GPS-RTK component that is mounted on gauge wheel 128 (or elsewhere on the row unit) that detects the position of gauge wheel 128 in a three-dimensional coordinate system. In this way, row unit position sensor 272 can output an indication of the height of the particular crop row being planted by the row unit 110. Alternatively, or in addition, row unit position sensor 272 can output a sensor signal that is used to detect the position of the ground-engaging element indirectly. For example, one or more row unit position sensors 272 can generate an indication of the relative position of the ground-engaging element to the mounting position at which row unit 110 is mounted on toolbar 108.

Figure 4:
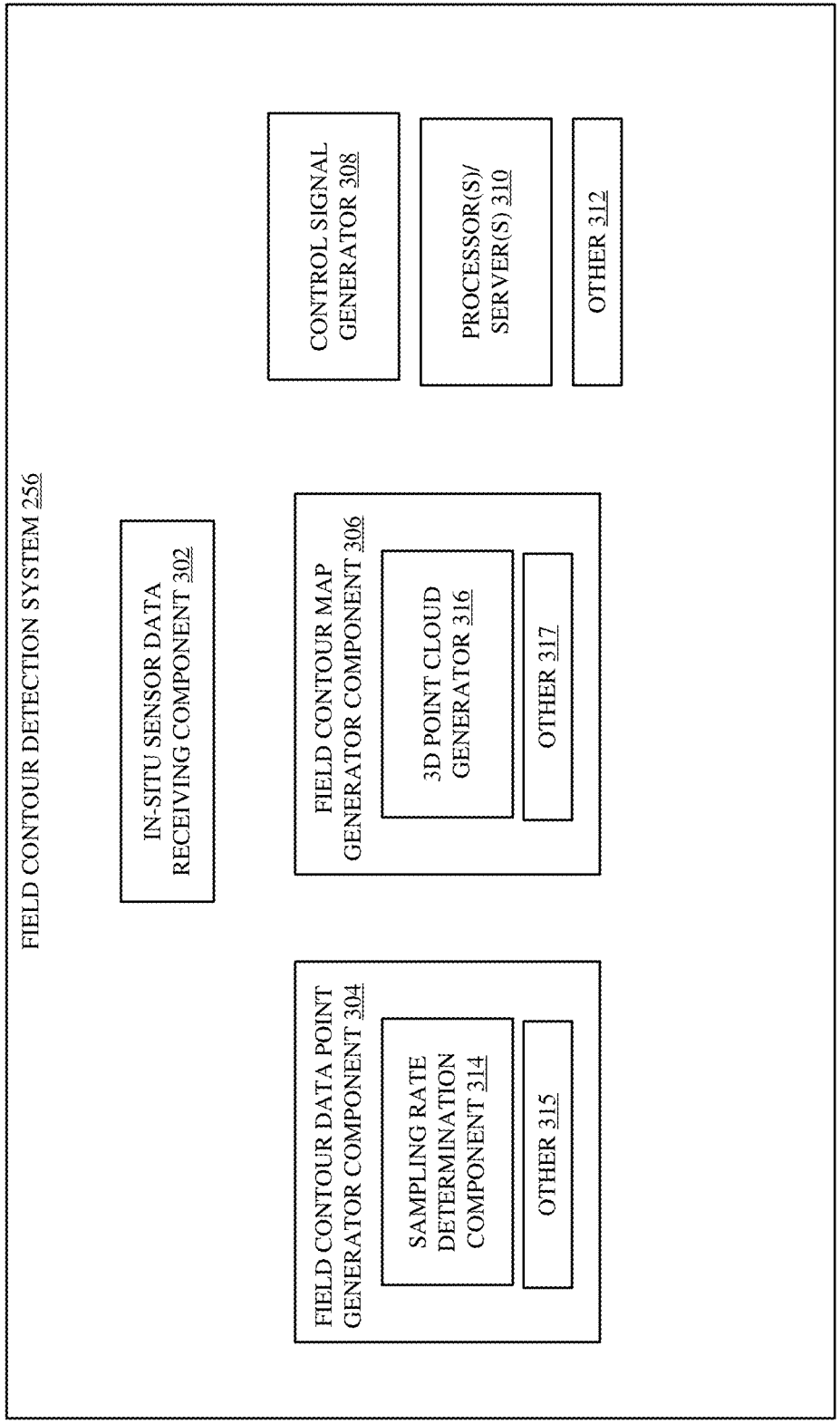
FIG. 4 is a block diagram of one example of a field contour detection system.

FIG. 4 illustrates one example of field contour detection system 256. As illustrated, system 256 includes an in-situ sensor data receiving component 302, a field contour data point generator component 304, a field contour map generator component 306, and a control signal generator 308. System 256 also can include one or more processors or servers 310, and can include other items 312 as well.

In-situ sensor data receiving component 302 is configured to receive in-situ sensor data from one or more in-situ sensors. For example, in-situ sensor data can be received from sensors 226 on planting machine 102. Alternatively, or in addition, sensor data can be received from sensors on machine 216, such as image data from an aerial vehicle (e.g., a UAV). Based on the sensor data, field contour data point generator component 304 is configured to generate sets of field contour data points corresponding to the crop rows. An example field contour data point represents an elevation of the surface of the field at the location represented by the data point. Component 304 includes a sampling rate determination component 314 configured to set a sampling rate for the data. For example, the data can be down sampled to the width of the rows so that a grid of data points is created that is aligned with the crop rows. Component 304 can include other items 315 as well.

Figure 5:
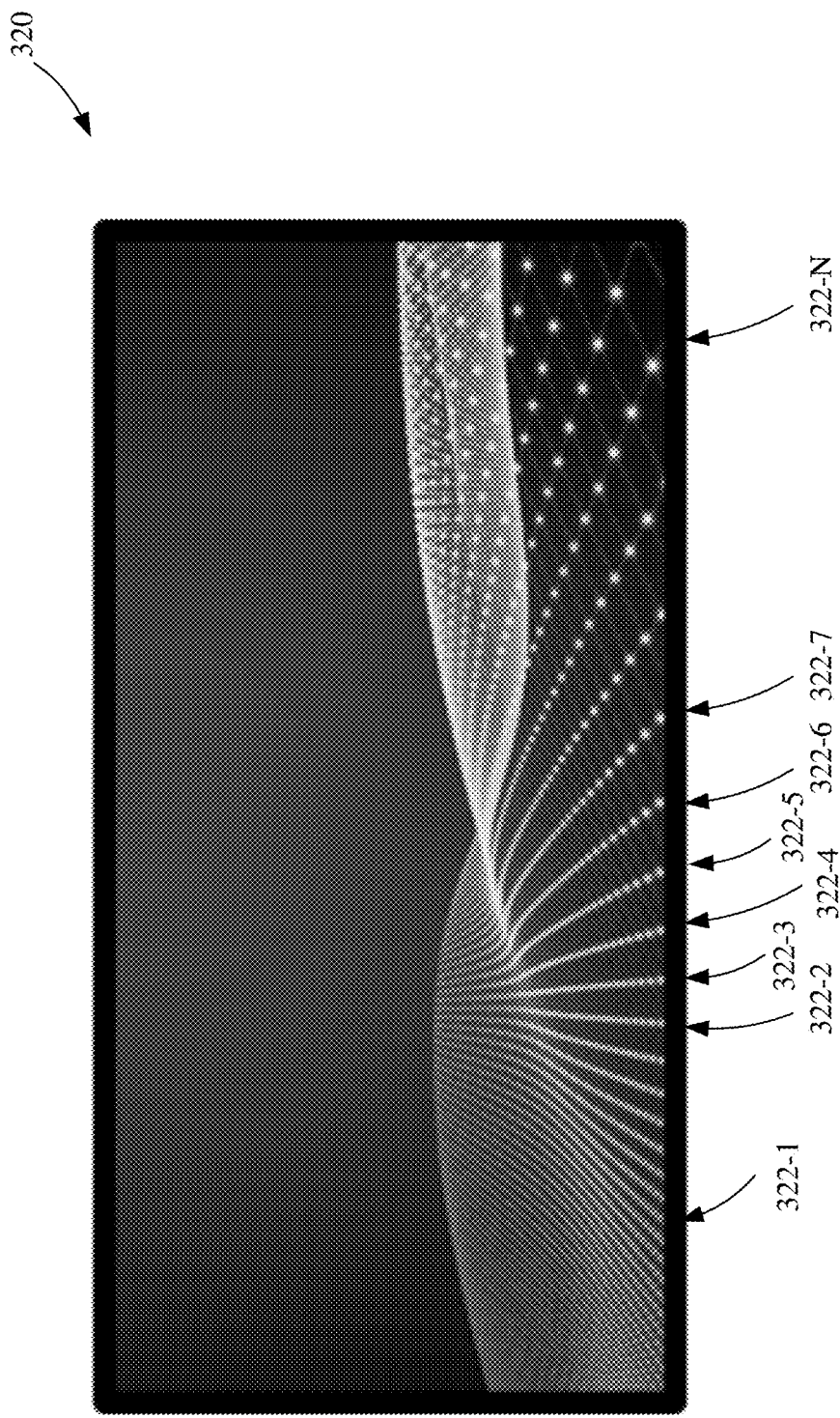
FIG. 5 illustrates one example of a field contour map.

Field contour map generator component 306 is configured to generate a field contour map based on the field contour data points generated by component 304. For example, but not by limitation, a three-dimensional point cloud generator 316 can generate a three-dimensional point cloud. One example is illustrated in FIG. 5. Component 306 can include other items 317 as well.

As shown in FIG. 5, a three-dimensional point cloud 320 includes a plurality of sets of data points 322-1, 322-3, 322-4, 322-5, 322-6, 322-7, 322-N (collectively referred to as data point sets 322), each corresponding to a different crop row detected on the field. The three-dimensional point cloud 320 forms a grid of data points corresponding to the planting locations of the crop rows, which can be used to control subsequent agricultural operations.

For example, referring again to FIG. 4, control signal generator 308 is configured to generate a control signal based on the field contour map. For example, operation of an agricultural machine, such as planting machine, spraying machine, harvesting machine, etc., is controlled based on the field contour map.

Figure 6:
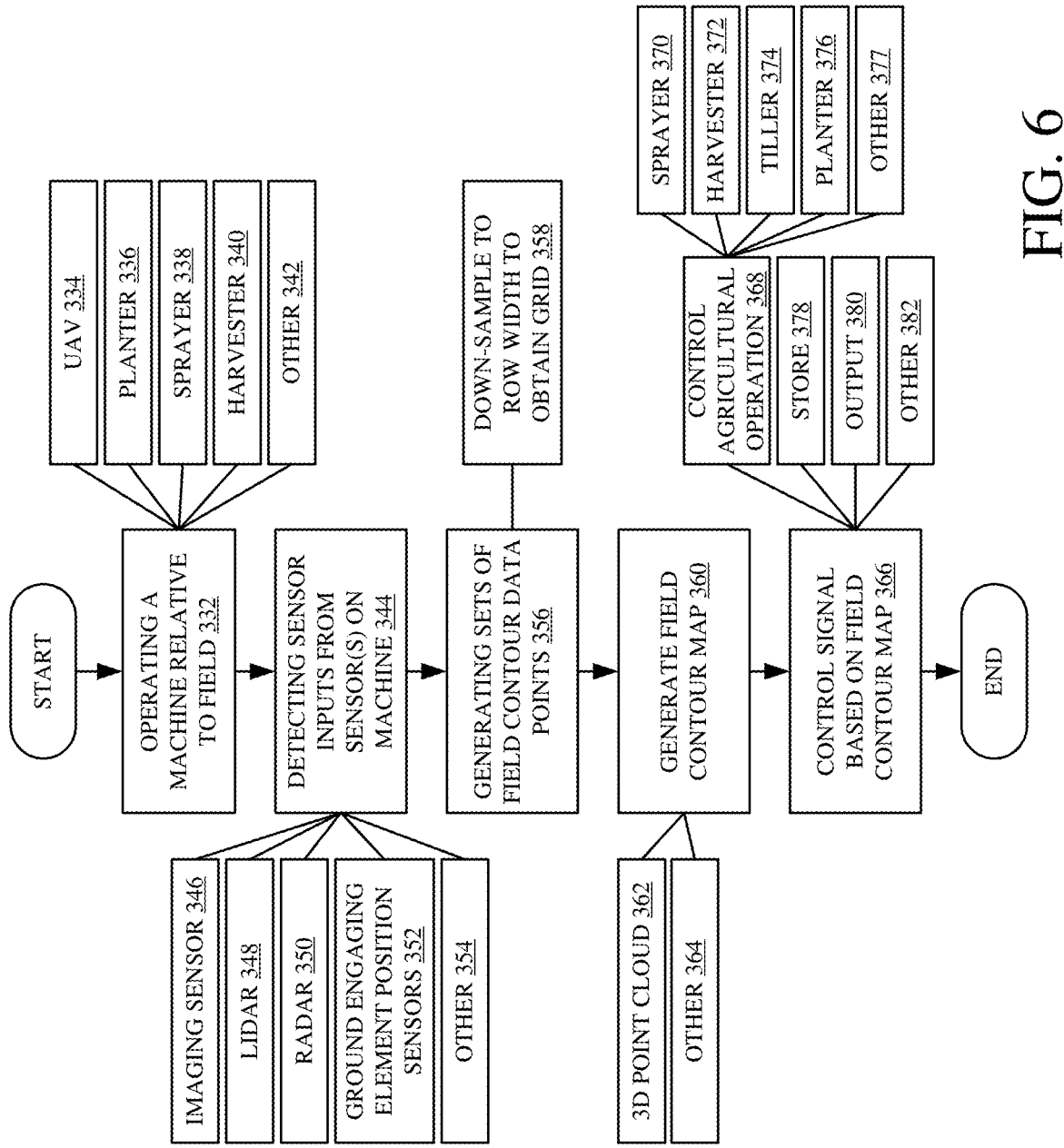
FIG. 6 is a flow diagram illustrating one example of operation of a field contour detection system.

FIG. 6 is a flow diagram illustrating one example of operation of a field contour detection system. For sake of illustration, but not by limitation, FIG. 6 will be discussed in the context of FIGS. 3 and 4.

At block 332, a mobile machine is operating relative to a target field. For example, the mobile machine can include an aerial vehicle, such as an unmanned aerial vehicle (UAV) or drone 334, operating over the target field. In other examples, the mobile machine can include a planting machine 336, a spraying machine 338, a harvesting machine 340, or can include other types of machines 342 as well.

At block 344, sensor inputs are detected from sensors on the mobile machine. For example, the sensors inputs can be received from imaging sensors 346, that acquire images of the field. Also, sensor inputs can be received from light detection and ranging (LIDAR) sensors 348, and/or radio detection and ranging (RADAR) sensors 350. Also, sensor inputs can be received from ground-engaging element position sensors (block 352) that detect the position of ground-engaging elements on the mobile machine. Of course, other sensor inputs can be received as well, as represented at block 354.

At block 356, sets of field contour data points are generated based on the sensor inputs. For example, the sensor inputs can be down sampled to the row width to obtain a grid that corresponds to the crop rows, as represented at block 358. Each data point is generated by identifying a given location along or aligned with the row, and, for the given location, elevation data is generated. The elevation data can be generated relative to any reference point, such as a base plane, sea level, etc. The data point is stored with latitude, longitude, and elevation information.

At block 360, a field contour map is generated based on the sets of field contour data points. For example, as represented at block 362, a three-dimensional point cloud, can be generated. One example is discussed above with respect to FIG. 5. Of course, other field contour maps can be generated as well, as represented at block 364.

At block 366, a control signal is generated by control signal generator 308 based on the field contour map. For example, an agricultural operation is controlled at block 368. Any of a number of different types of agricultural operations can be controlled.

For example, an agricultural sprayer is controlled at block 370. One agricultural sprayer includes a boom supporting spray nozzles. Based on the field contour map, a control system of the agricultural sprayer determines changes in field contour in a path of the agricultural sprayer. The control system performs predictive boom height control, to control a height of the boom at a desired distance from the crop canopy (e.g., four to six inches from the plants). The predictive control proactively controls the boom height prior to reaching the corresponding areas of the field (as opposed to the sprayer sensing the field surface and reacting to field surface changes). Also, on-board sensor data (such as RADAR data) acquired by sensors on the agricultural sprayer can be used in combination with the field contour data. For example, differential between the RADAR data and the field contour map can be determined and used to control the sprayer height. Alternatively, or in addition, the control system can control other aspects, such as route planning, suspension settings, machine speed settings, etc. Route planning can determine the path to be taken by the sprayer based on the field contour, as well as the size of boom needed to cover the field. Also, the control can be used to adjust shock damping and/or machine speed prior to the agricultural sprayer reaching areas of undulation. The sprayer control can increase spraying performance, such as by decreasing over-spray or under-spray in windy conditions. Other data such as expected crop maturity, etc. can be utilized along with the field contour data to determine the crop canopy.

In another example, as illustrated at block 372, an agricultural harvester can be controlled based on the field contour map. For example, the height of the front-end harvesting equipment (cutter bar, header, etc.) is controlled to harvest the crop at a desired height based on the field contour map. Height control can be especially advantageous in situations where harvesting performance is affected by missed or unharvested crop. In the case of sugarcane, for example, sugar concentration is typically highest at the bottom portion of the stalk. Harvesting the sugarcane close to the ground (e.g., within a quarter of an inch, etc.) without contacting the ground can result in increased harvesting performance and yield.

In another example, as illustrated at block 374, a tiller operation is controlled based on the three-dimensional point cloud. Based on changes to the field surface contour, the positions of the tilling implements are adjusted to maintain a desired tilling depth.

In another example, at block 376, planter operation can be controlled based on the three-dimensional point cloud. The control can include adjusting the location of the row units of the planter to align with the field contour data points, adjusting the downforce, and/or adjusting the depth of the furrow opener 126.

Of course, other agricultural operations can be controlled as well, as represented at block 377.

The control signal can control other aspects of architecture 200. For example, the field contour map can be stored at block 378, such as in data store 228. Alternatively, or in addition, the field contour map can be output at block 380, such as to machine 216, remote computing system 218, etc. Of course, the control signal can control other aspects as well, as represented at block 382.

Figure 7:
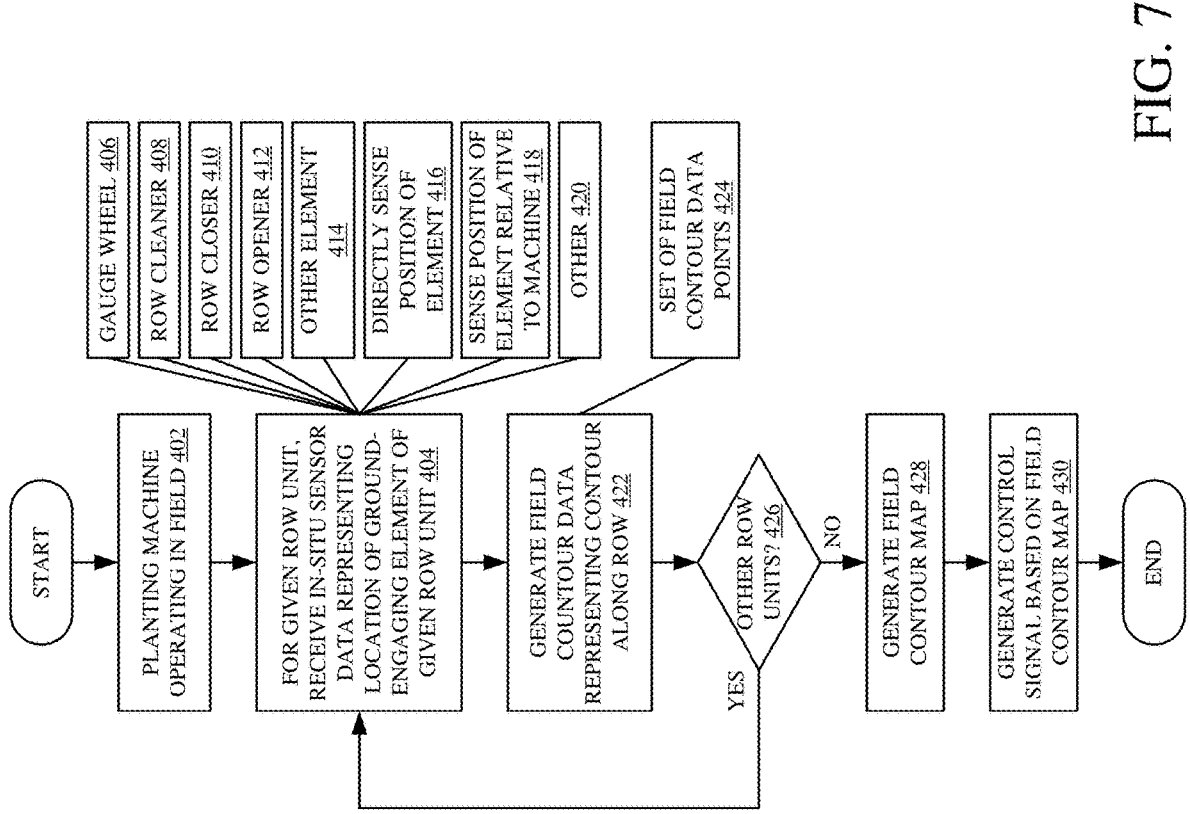
FIG. 7 is a flow diagram illustrating one example of operation of a field contour detection system using sensor inputs from a ground-engaging element position sensor.

FIG. 7 is a flow diagram illustrating an example operation of a field contour detection system using sensor inputs from ground-engaging element position sensors (e.g., block 352 in FIG. 6). For sake of illustration, but not by limitation, FIG. 7 will be discussed in the context of FIGS. 3 and 4.

At block 402, planting machine 102 is operating in a field. At block 404, for each given row unit 110, in-situ sensor data is received representing the location of a ground-engaging element on the row unit 110. For example, the ground-engaging element can include gauge wheel 128, as represented at block 406. In another example, the ground-engaging element can include row cleaner 268, as represented at block 408, row closer 130, as represented at block 410, furrow opener 126, as represented at block 412, or another element, as represented at block 414.

The in-situ sensor data can represent direct sensing of the position of the ground-engaging element, as represented at block 416. The position of the ground-engaging element can be directly sensed by a position sensor on the element itself. For example, a GPS-RTK position sensor can be mounted to gauge wheel 128 to give an indication of latitude, longitude, and elevation in a global coordinate system. Based on this position information, field contour data point generator component 304 can generate data points representing the height of the ground surface at various positions along the path of the given row unit.

Alternatively, or in addition, the position of the ground-engaging element can be sensed relative to the frame (e.g., toolbar 108 in FIG. 1), as represented at block 418. For example, a position of the ground-engaging element relative to the frame is detected using row unit position sensor(s) 272. Briefly, as an example, the angle of gauge wheel control arms 150 can be utilized to determine the position of the gauge wheel relative to the mounting location of row unit 110 on toolbar 108. Thus, based on determining the spatial position of the portion of toolbar 108 on which the given row unit 110 is mounted, the relative position information can be used to determine the position of the bottom of gauge wheel 128 that contacts the surface of ground 148. The contour data points represent the field surface positions.

Of course, the in-situ sensor data can represent the location of the ground-engaging element in other ways as well, as represented at block 420.

At block 422, field contour data is generated representing the contour along the row traveled by the given row unit. For example, a set of field contour data points (e.g., data points 322-N) are generated at block 424 as the given row unit travels across the field.

If there are other row units 110, at block 426 operation returns to block 404 in which additional in-situ sensor data is received for the other row units to generate corresponding sets of field contour data points for those row units. At block 428, a field contour map is generated based on the sets of field contour data points. At block 430, a control signal is generated based on the field contour map. Examples are discussed above with respect to FIG. 366.

Figure 8:
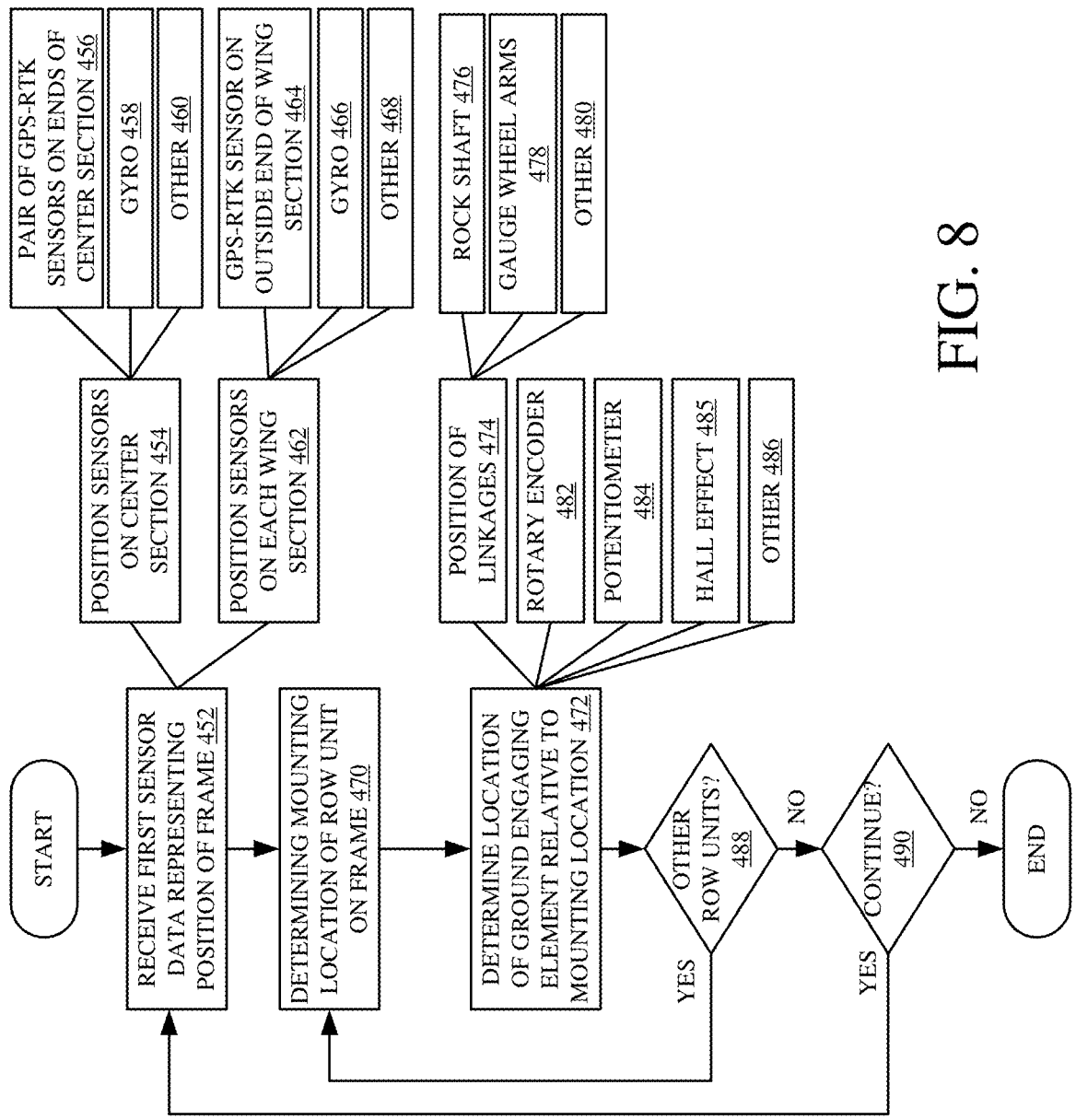
FIG. 8 is a flow diagram illustrating one example of operation of a field contour detection system using a row unit position sensor.

FIG. 8 is a flow diagram illustrating one example of operation of field contour detection system 256 using row unit position sensor(s) 272. At block 452, first sensor data is received representing the position of a frame of planting machine 102. As shown in FIG. 8, the first sensor data represents the position of a center section of the frame and is received from center section sensors 244, as represented at block 454. At block 456, the sensors can include a pair of GPS-RTK sensors that are located on the opposing ends of the center section. An example GPS-RTK sensor has a sampling rate that refers to the number of times per second that the chipset and satellites communicate to establish the device location (e.g., a device with a one Hertz (Hz) sample rate receives location once per second. A reporting rate refers to how often the sensor reports its location. In one particular example, the GPS-RTK sensor is configured with a sampling rate of approximately 0.1 Hertz (Hz) and a reporting rate of 0.5 Hz. Alternatively, or in addition, the position sensors can include gyroscopes, as represented at block 458, and can include other sensors 460 as well.

Also, the first sensor data can include sensor signals from position sensors on wing sections, as represented at block 462. For example, a GPS-RTK sensor is placed on an outside edge (relative to the center of the planting machine) of the wing section, as represented at block 464. Again, other sensors such as a gyroscope (block 466) or other sensors (block 468) can be utilized as well.

Figure 9:
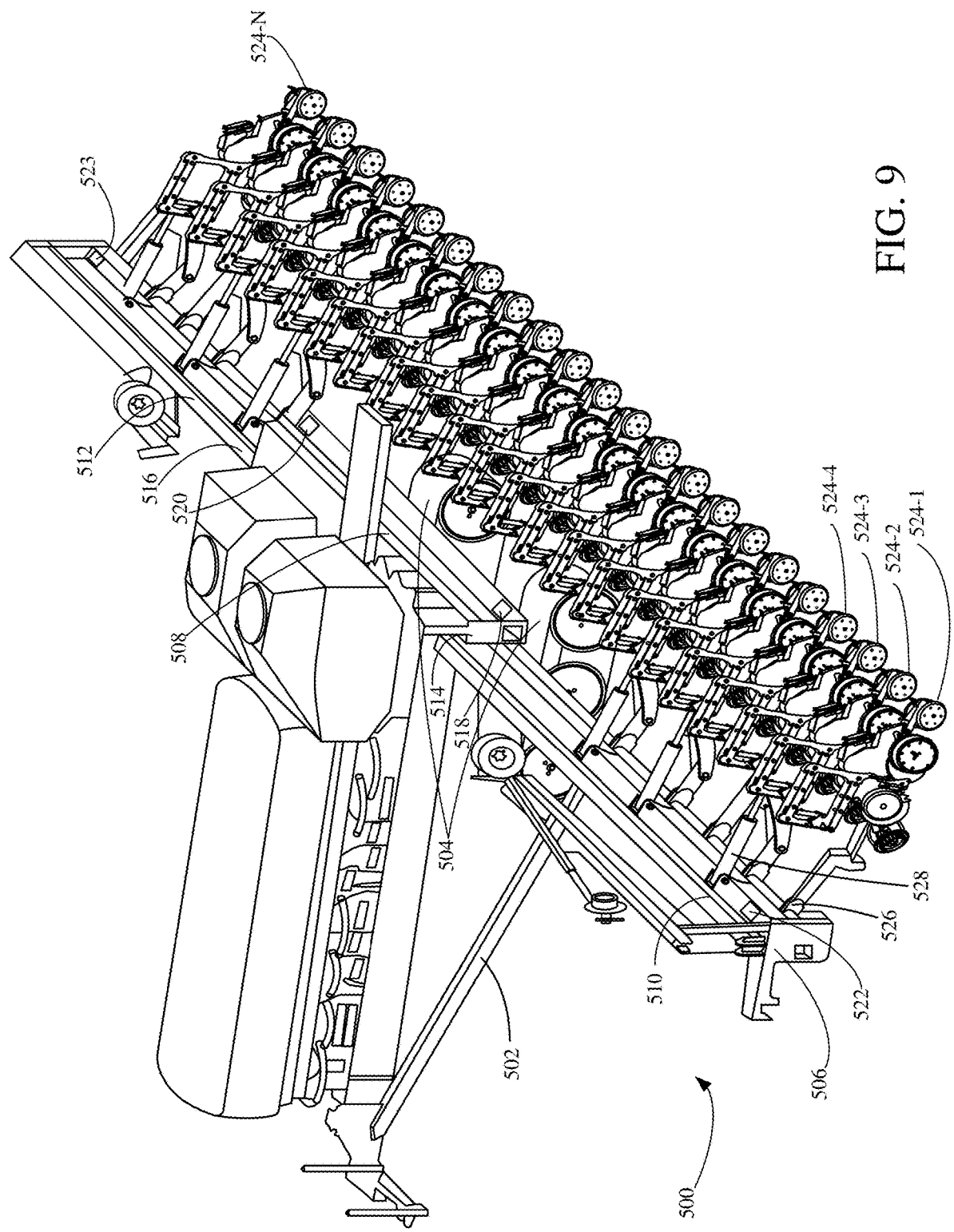
FIG. 9 illustrates one example of position sensors on a planting machine.

FIG. 9 illustrates one example of mounting locations of position sensors on a planting machine 500. Planting machine 500 includes a frame 502 supported by tracks 504, or other ground-engaging elements such as wheels. Frame 502 includes a toolbar 506 having a center section 508, a first wing section 510 and a second wing section 512. Wing sections 510 and 512 are pivotably coupled to center section 508 at pivot assemblies 514 and 516, respectively. A first position sensor 518 is mounted on a first end of center section 508 and a second position sensor 520 is positioned on opposite end of center section 508. Each of position sensors 518 and 520 are configured to generate sensor signals indicating the position of the respective ends of center section 508. Accordingly, based on this sensor data, the spatial position of any point along center section 508 can be determined.

Wing section 510 includes a position sensor 522 mounted at or near an end of wing section 512. Similarly, wing section 512 includes a position sensor 523 mounted at an end of wing section 512. The position sensors 522 and 523 on wing sections 510 and 512 generate an indication of the position of the respective ends of wing sections 510 and 512.

Based on this position data, and the position data generated by sensors 518 and 520, which represent the position of pivot assemblies 514 and 516, spatial position of points along wing sections 510 and can be determined. Thus, the mounting location of any row unit mounted to toolbar 506 can be determined.

Planting machine 500 illustratively includes a plurality of row units 524-1, 524-2, 524-3, 524-4, 524-N, etc. (collectively referred to as row units 524). Each row unit 524 is mounted to toolbar 506 by a corresponding connection assembly. In the example illustrated in FIG. 9, row unit 524-1 includes a rockshaft 526, mounted to wing section 510 at a pivotable connection. As such, the position of rockshaft 526 is controlled by one or more rockshaft cylinders 528.

Figure 10:
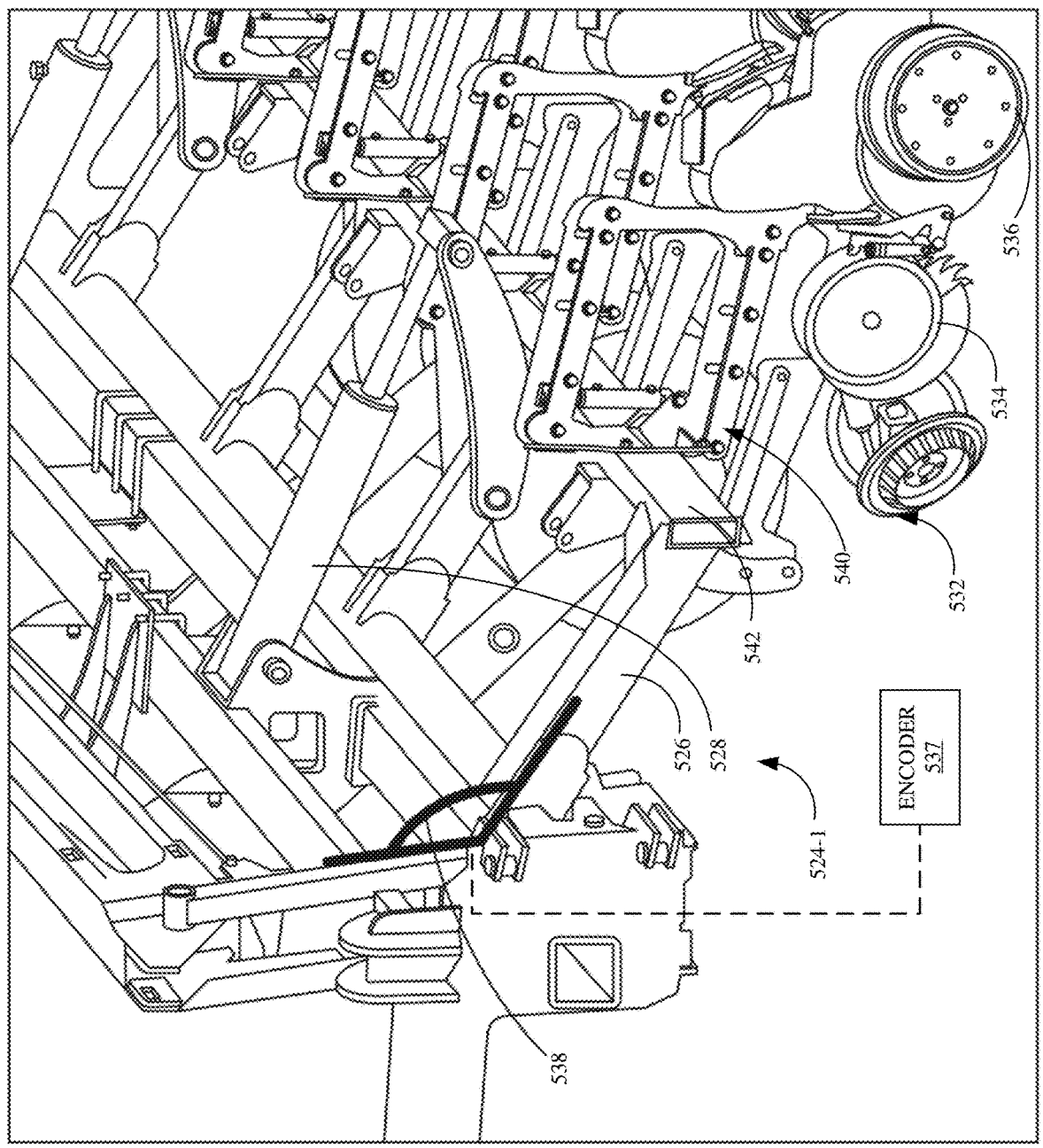
FIG. 10 is a perspective view showing one example of a row unit.

FIG. 10 is a perspective view showing row unit 524-1 in further detail. As shown in FIG. 10, row unit 524-1 includes a plurality of ground-engaging elements, including a row cleaner 532, a gauge wheel 534, and a row closer 536.

Referring again to FIG. 8, at block 470, a mounting location of the row unit on the frame is determined and, at block 472, a location of a ground-engaging element relative to the mounting location is determined. For example, block 470 can determine the location of the ends of sections 508, 510, and 512 based on sensors 518, 520, 522, and 523. Then, the position of each portion of the frame 506 is extrapolated. Block 472 can include determining a position of linkages between the ground-engaging element and the mounting location, as represented at block 474. The linkages can include, but is not limited to, a rockshaft (represented at block 476), gauge wheel control arms (represented at block 478), and can include other types of linkages, as represented at block 480.

The location of the ground-engaging element can be determined by any of a number of different types of row unit position sensors. For example, the sensor can include a rotary encoder (block 482) a potentiometer (block 484), a Hall Effect sensor (block 485), or other types of sensors (block 486).

With respect to the example shown in FIG. 10, an encoder 537 (such as a rotary encoder) is mounted to detect the angle 538 of rockshaft 526. Further, where the ground-engaging element is coupled to rockshaft 526 using one or more additional linkages, additional sensors can be utilized to detect the position of those linkages with respect to the rock arm. For example, as shown in FIG. 10, a linkage assembly 540 is coupled to a support beam 542 carried on rockshaft 526. Linkage assembly 540 supports the ground-engaging element (e.g., gauge wheel 534) and allows movement of the ground-engaging element relative to rockshaft 526.

Figure 11:
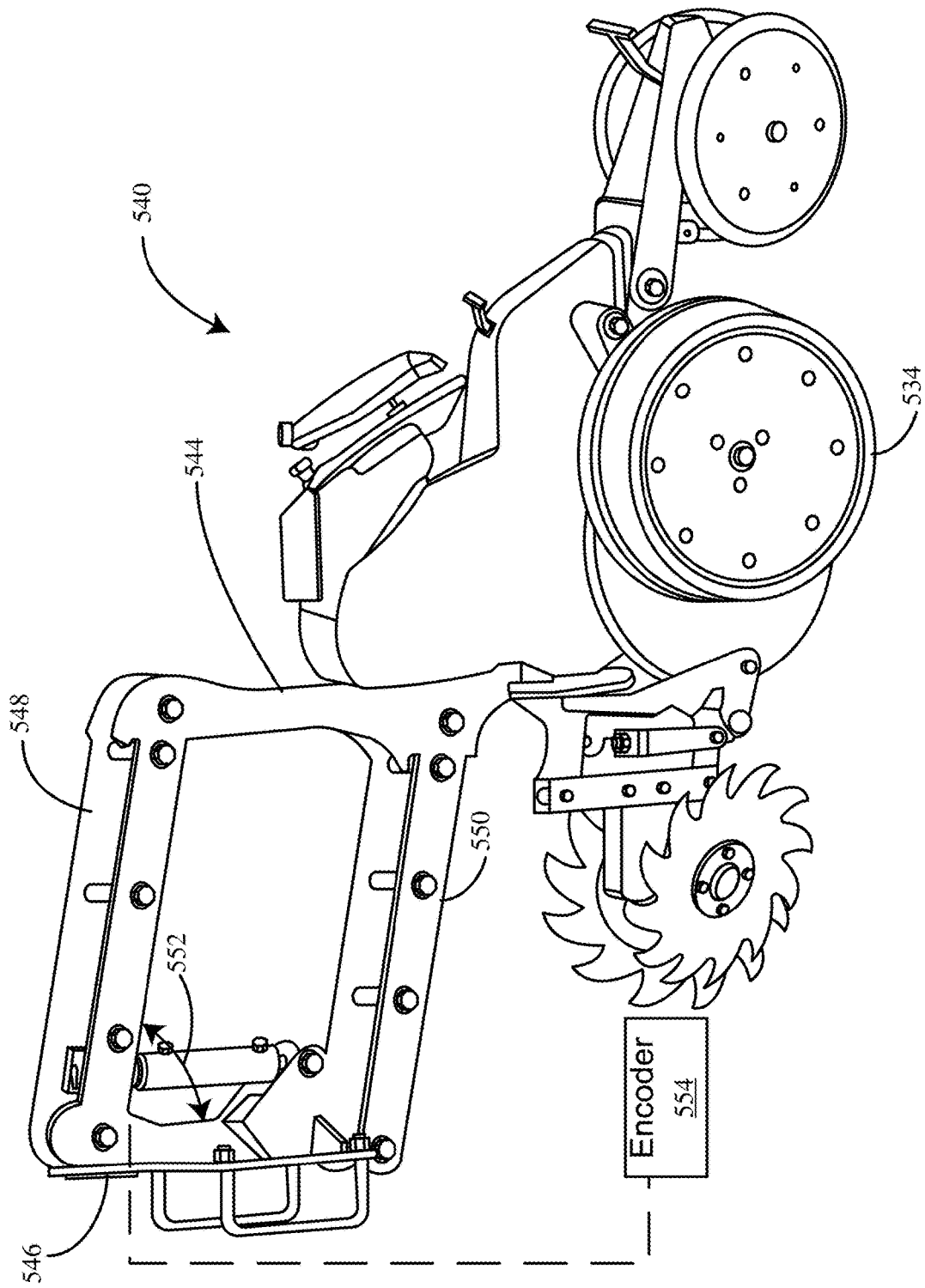
FIG. 11 illustrates one example of a linkage on a row unit.

FIG. 11 illustrates one example of linkage assembly 540. As shown, linkage assembly 540 includes a first pair of parallel arms 544 and 546, and a second pair or parallel arms 548 and 550. As the height of the row unit changes, the relative angle 552 between the first pair of arms 544, 546 and the second pair of arms 548 and 550 changes as well. The angle 552 can be measured directly with an encoder 554 that is coupled to one of the first pair of arms and the second pair of arms. Encoder 554 can be any suitable type of encoder including a rotary potentiometer, a linear potentiometer, a rotary magnetic encoder, a linear magnetic encoder, a rotary optical encoder, a linear optical encoder, and the like. Encoder 554 provides a measurement of angle 552, which can be used to determine the height of gauge wheel 534 relative to the mounting location of arm 546 (relative to rockshaft 526). Accordingly, the vertical position of gauge wheel 534 relative to the mounting location of row unit 524-1 on toolbar 506 is determined based on the position of wing section 510 (as determined based on signals from sensors 518 and 522) and angles 538 and 552.

Referring again to FIG. 8, at block 488, the operation determines whether there are additional row units (e.g., row units 524). If so, operation returns to block 470 where the mounting location of the other row units is determined along with the relative location of the ground-engaging elements supported by those row units.

Once all row units have been considered, operation proceeds to block 490 where, if operation of the machine is continued, operation returns to block 452 where any changes to the relative positions of the frame as the machine traverses the field are sensed.

It can thus be seen that the present features provide a field contour sensing system that obtains field contour data, that is utilized to generate a three-dimensional point cloud or other field contour map. This field contour map provides field contour data with reduced noise compared to data that is obtained during tilling, spraying, harvesting, or other agricultural operations. During the planting operation, the field is typically in the most prepared or flat condition, so that the field has a relatively low amounts of clods or other characteristics that can introduce significant noise to the detection. Further, the planting machine typically traverses the entire field over which subsequent operations (spraying, harvesting, subsequent year planting, etc.) will occur. Thus, the present field contour detection approach achieves data with increased accuracy and overall field coverage.

The present discussion has mentioned processors and servers. In one example, the processors and servers include computer processors with associated memory and timing circuitry, not separately shown. The processors and servers are functional parts of the systems or devices to which the processors and servers belong and are activated by, and facilitate the functionality of the other components or items in those systems.

Also, a number of user interface displays have been discussed. The user interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The user actuatable input mechanisms can be actuated in a wide variety of different ways. For instance, user actuatable input mechanisms can be actuated using a point and click device (such as a track ball or mouse). The user actuatable input mechanisms can be actuated using hardware buttons, switches, a joystick or keyboard, thumb switches or thumb pads, etc. The user actuatable input mechanisms can also be actuated using a virtual keyboard or other virtual actuators. In addition, where the screen on which the user actuatable input mechanisms are displayed is a touch sensitive screen, the user actuatable input mechanisms can be actuated using touch gestures. Also, where the device that displays them has speech recognition components, the user actuatable input mechanisms can be actuated using speech commands.

A number of data stores have also been discussed. It will be noted the data stores can each be broken into multiple data stores. All of the data stores can be local to the systems accessing the data stores, all of the data stores can be remote, or some data stores can be local while others can be remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, logic, and interactions. It will be appreciated that any or all of such systems, components, logic and interactions may be implemented by hardware items, such as processors, memory, or other processing components, including but not limited to artificial intelligence components, such as neural networks, some of which are described below, that perform the functions associated with those systems, components, logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 12:
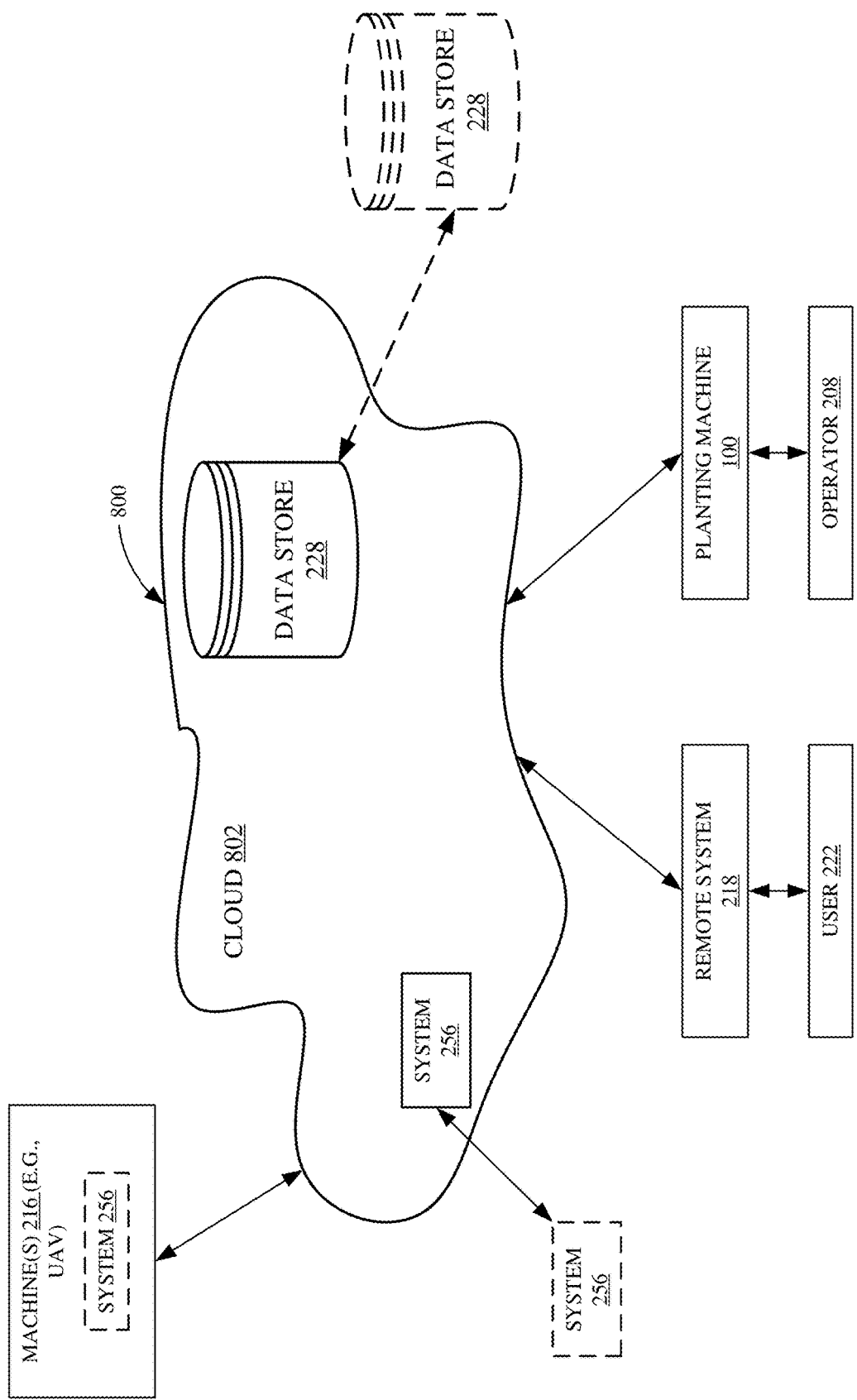
FIG. 12 is a block diagram showing one example of the architecture illustrated in FIG. 1, deployed in a remote server architecture.

FIG. 12 is a block diagram of one example of harvesting machine architecture 200, shown in FIG. 3, where machine 100 communicates with elements in a remote server architecture 800. In an example, remote server architecture 800 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and the remote servers can be accessed through a web browser or any other computing component. Software or components shown in previous FIGS. as well as the corresponding data, can be stored on servers at a remote location. The computing resources in a remote server environment can be consolidated at a remote data center location or the computing resources can be dispersed. Remote server infrastructures can deliver services through shared data centers, even though the services appear as a single point of access for the user. Thus, the components and functions described herein can be provided from a remote server at a remote location using a remote server architecture. Alternatively, the components and functions can be provided from a conventional server, or the components and functions can be installed on client devices directly, or in other ways.

In the example shown in FIG. 12, some items are similar to those shown in previous figures and the items are similarly numbered. FIG. 12 specifically shows system 256 from previous FIGS. can be located at a remote server location 802. Therefore, machine 100, machine 216, and/or system 218 can access those systems through remote server location 802.

FIG. 12 also depicts another example of a remote server architecture. FIG. 12 shows that it is also contemplated that some elements of previous FIGS. are disposed at remote server location 802 while others are not. By way of example, one or more of data store 228 and system 256 can be disposed at a location separate from location 802, and accessed through the remote server at location 802. Regardless of where the systems and data stores are located, the systems and data stores can be accessed directly by machines 100 and/or 216 through a network (either a wide area network or a local area network), the systems and data stores can be hosted at a remote site by a service, or the systems and data stores can be provided as a service, or accessed by a connection service that resides in a remote location. All of these architectures are contemplated herein.

It will also be noted that the elements of the FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
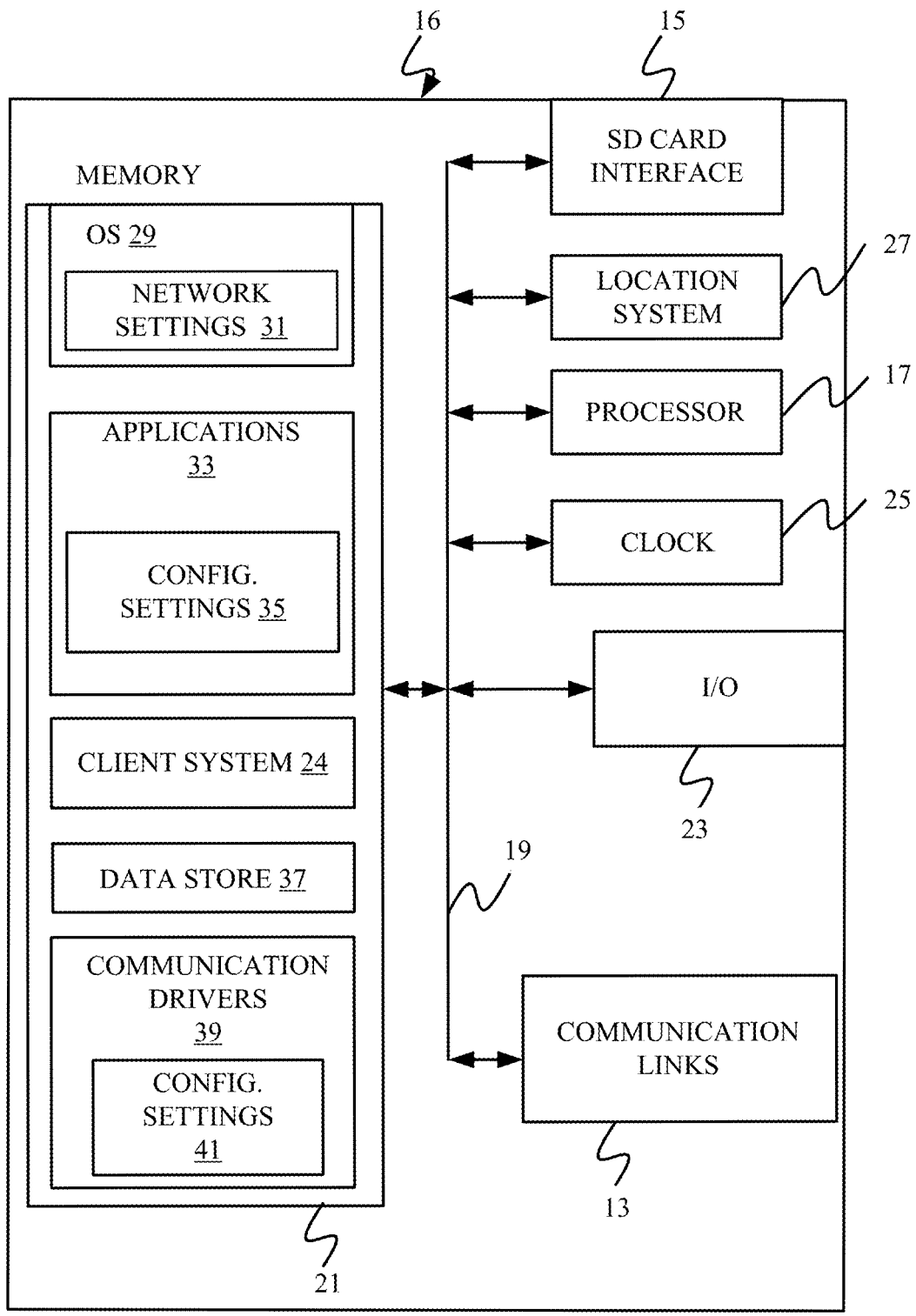
FIGS. 13-15 show examples of mobile devices that can be used in the architectures shown in the previous figures.

FIG. 13 is a simplified block diagram of one illustrative example of a handheld or mobile computing device that can be used as a user's or client's handheld device 16, in which the present system (or parts of the present system) can be deployed. For instance, a mobile device can be deployed in the operator compartment of machine 100 for use in generating, processing, or displaying machine speed and performance metric data. FIGS. 11-12 are examples of handheld or mobile devices.

FIG. 13 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively includes a real time clock component that outputs a time and date. Clock 25 can also, illustratively, provide timing functions for processor 17.

Location system 27 illustratively includes a component that outputs a current geographic location of device 16. Location system 27 can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Figure 14:
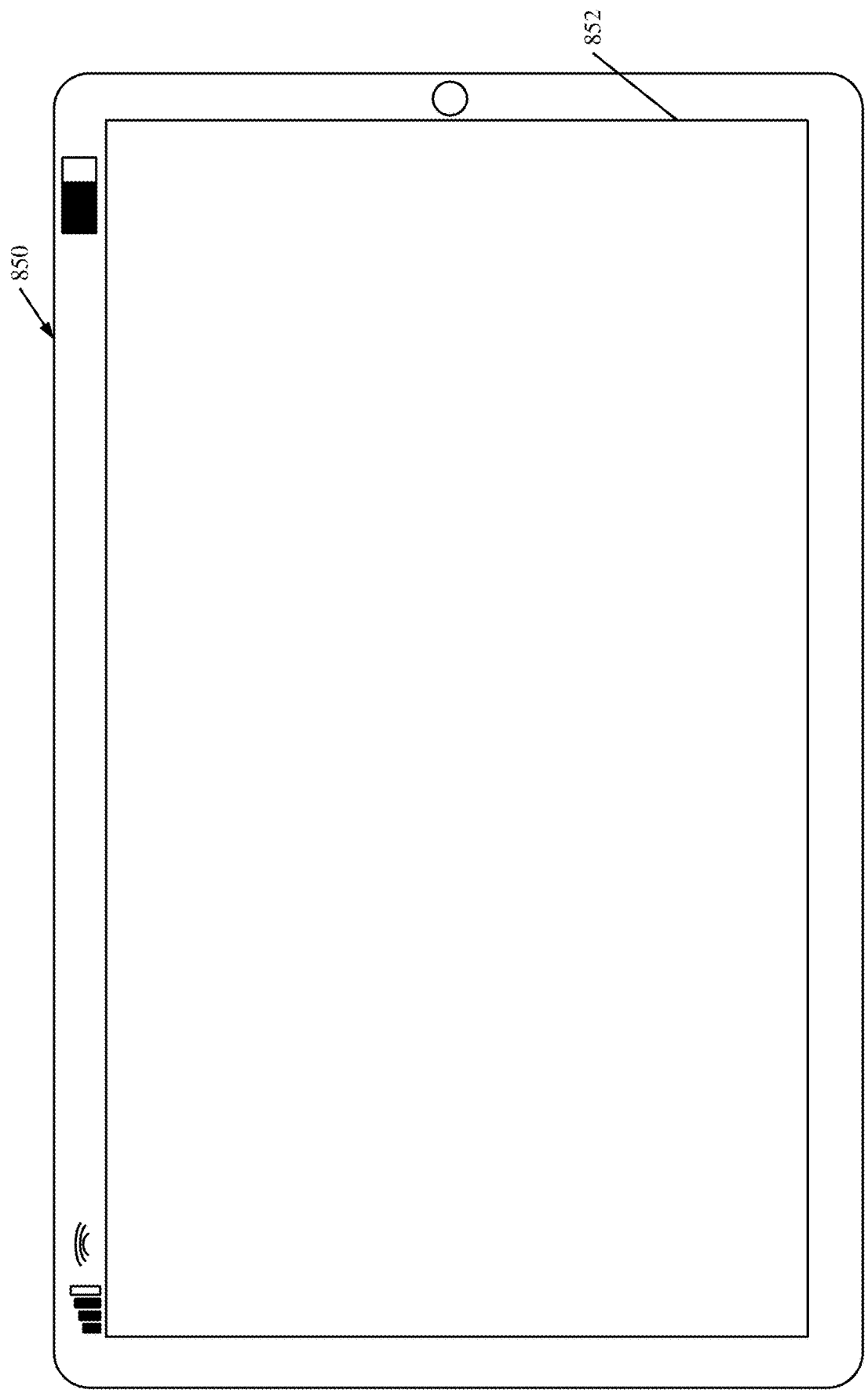

FIG. 14 shows one example in which device 16 is a tablet computer 850. In FIG. 14, computer 850 is shown with user interface display screen 852. Screen 852 can be a touch screen or a pen-enabled interface that receives inputs from a pen or stylus. Screen 852 can also use an on-screen virtual keyboard. Of course, screen 852 might also be attached to a keyboard or other user input device through a suitable attachment mechanism, such as a wireless link or USB port, for instance. Computer 850 can also illustratively receive voice inputs as well.

Figure 15:
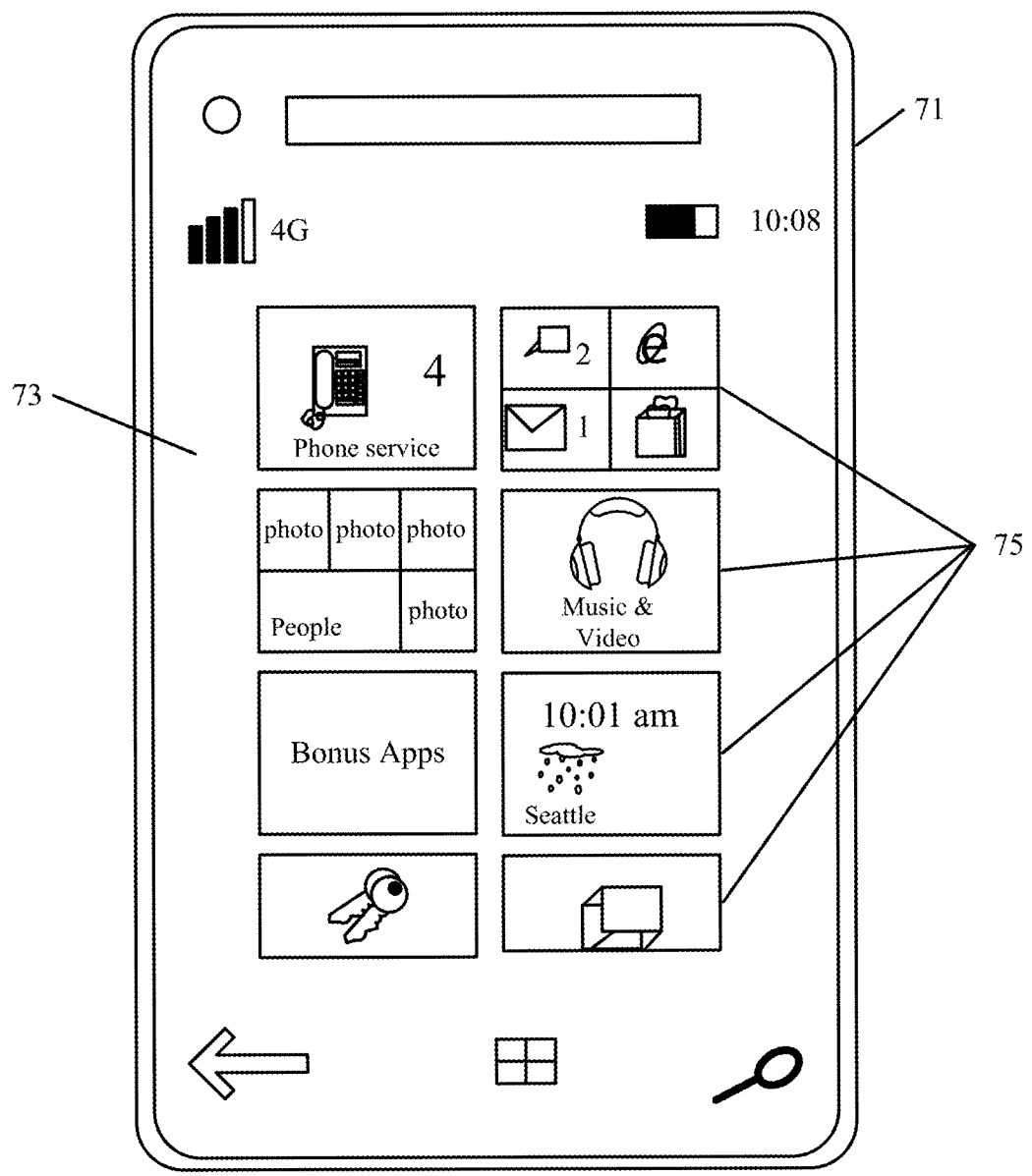

FIG. 15 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 16:
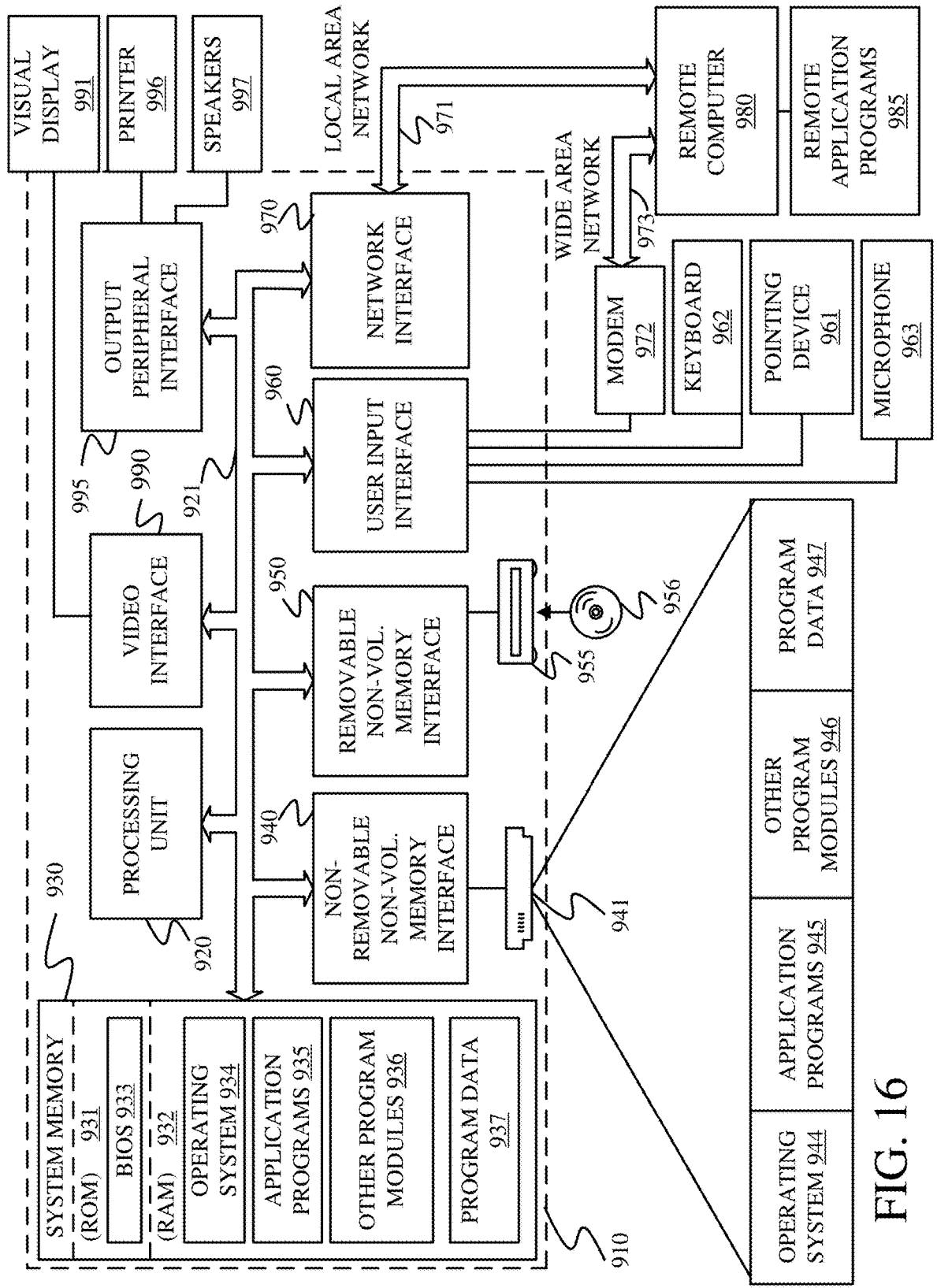
FIG. 16 is a block diagram showing one example of a computing environment that can be used in the architectures shown in the previous figures.

FIG. 16 is one example of a computing environment in which elements of previous FIGS., or parts of them, (for example) can be deployed. With reference to FIG. 16, an example system for implementing some embodiments includes a general-purpose computing device in the form of a computer 910 programmed to operate as discussed above. Components of computer 910 may include, but are not limited to, a processing unit 920 (which can include processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to previous FIGS. can be deployed in corresponding portions of FIG. 16.

Computer 910 typically includes a variety of computer readable media. Computer readable media can be any available media that can be accessed by computer 910 and includes both volatile and nonvolatile media, removable and non-removable media. By way of example, and not limitation, computer readable media may include computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 16 illustrates operating system 934, application programs 935, other program modules 936, and program data 937.

The computer 910 may also include other removable/non-removable volatile/nonvolatile computer storage media. By way of example only, FIG. 16 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware components. For example, and without limitation, illustrative types of hardware components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 910. In FIG. 16, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a controller area network—CAN, a local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 16 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural planting machine comprising:
    a frame;
    a planting system supported on the frame and configured to plant seeds in a row, the planting system comprising a ground-engaging element movable relative to the frame and configured to engage a ground surface of a field; and
    a field contour detection system configured to:
        receive, during operation of the agricultural planting machine on the field, in-situ sensor data representing a location of the ground-engaging element;
        obtain elevation data based on the in-situ sensor data, the elevation data representing an elevation of the ground-engaging element at a plurality of different locations on the field;
        generate a field contour map representing a contour of the ground surface based on the elevation data representing the elevation of the ground-engaging element at the plurality of different locations on the field; and
        generate a control signal based on the field contour map.

2. The agricultural planting machine of claim 1, wherein the planting system comprises a row unit, and the ground-engaging element comprises a rotatable element on the row unit.

3. The agricultural planting machine of claim 2, wherein the rotatable element comprises a gauge wheel of the row unit.

4. The agricultural planting machine of claim 3, wherein the gauge wheel includes a linkage having an angle, relative to the frame, that varies with positional changes of the gauge wheel, and
    the in-situ sensor data is received from a sensor coupled to the linkage and represents the angle.

5. The agricultural planting machine of claim 4, wherein the sensor comprises an encoder.

6. The agricultural planting machine of claim 5, wherein the linkage comprises a rockshaft pivotally coupled to the frame.

7. The agricultural planting machine of claim 1, wherein the in-situ sensor data comprises:
    first data representing a first position of the frame; and
    second data representing a second position of the ground-engaging element relative to the frame.

8. The agricultural planting machine of claim 1, wherein the field contour map comprises a three-dimensional point cloud.

9. The agricultural planting machine of claim 1, wherein the control signal is configured to control the agricultural planting machine to at least one of:
    store the field contour map in a data store; or
    output the field contour map.

10. The agricultural planting machine of claim 1, and further comprising:
    a position sensor mounted to the ground-engaging element and configured to generate the in-situ sensor data.

11. The agricultural planting machine of claim 1, wherein the in-situ sensor data is received at least partially from a rotation sensor.

12. The agricultural planting machine of claim 1, wherein the in-situ sensor data is received at least partially from a geographic position sensor.

13. A computer-implemented method comprising:
    receiving first sensor data representing an elevation of a frame of an agricultural planting machine, wherein a ground-engaging element is movably mounted relative to the frame;
    receiving second sensor data representing a relative position of the ground-engaging element relative to the frame;
    generating field contour data representing a contour of a ground surface of a field based on the first sensor data and the second sensor data; and
    generating a control signal based on the field contour data.

14. The computer-implemented method of claim 13, wherein the agricultural planting machine includes a row unit, and the ground-engaging element comprises a rotatable element on the row unit.

15. The computer-implemented method of claim 14, wherein the rotatable element includes a linkage having an angle, relative to the frame, that varies with positional changes of the rotatable element, and the second sensor data is received from a sensor coupled to the linkage and represents the angle.

16. The computer-implemented method of claim 13, wherein the field contour data comprises a three-dimensional point cloud.

17. The computer-implemented method of claim 13, wherein generating a control signal comprises at least one of:
    storing the field contour data in a data store; or
    outputting the field contour data.

18. A control system for an agricultural planting machine, the control system comprising:
    at least one processor, and
    memory storing instructions executable by the at least one processor, wherein the instruction, when executed, cause the control system to:
        receive first sensor data representing a location of a frame of the agricultural planting machine, the agricultural planting machine including a row unit movably mounted relative to the frame, and the row unit having a ground-engaging element configured to engage a ground surface of a field;
        receive second sensor data representing a location of the ground-engaging element relative to the frame;
        generate field contour data representing a contour of the ground surface of the field based on the first sensor data and the second sensor data; and
        generate a control signal based on the field contour data.

19. The control system of claim 18, wherein the second sensor data indicates an angle of a linkage between the ground-engaging element and the frame, wherein the angle varies with positional changes of the ground-engaging element.

20. The control system of claim 18, wherein the field contour data comprises a three-dimensional point cloud.

21. The control system of claim 18, wherein the control signal is configured to at least one of:
  store the field contour data in a data store; or
  output the field contour data.

* * * * *